(12) United States Patent
Sun et al.

(10) Patent No.: US 11,838,222 B2
(45) Date of Patent: Dec. 5, 2023

(54) IN-LINE DATA IDENTIFICATION ON NETWORK

(71) Applicant: Western Digital Technologies, Inc., San Jose, CA (US)

(72) Inventors: Chao Sun, San Jose, CA (US); Pietro Bressana, Lugano (CH); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 227 days.

(21) Appl. No.: 16/724,226

(22) Filed: Dec. 21, 2019

(65) Prior Publication Data
US 2021/0194829 A1 Jun. 24, 2021

(51) Int. Cl.
| | | |
|---|---|---|
| *H04L 49/356* | (2022.01) | |
| *H04L 49/65* | (2022.01) | |
| *H04L 69/22* | (2022.01) | |
| *H04L 67/1097* | (2022.01) | |
| *H04L 49/60* | (2022.01) | |

(52) U.S. Cl.
CPC ............ *H04L 49/356* (2013.01); *H04L 49/60* (2013.01); *H04L 49/65* (2013.01); *H04L 67/1097* (2013.01); *H04L 69/22* (2013.01)

(58) Field of Classification Search
CPC ....... H04L 49/356; H04L 49/60; H04L 49/65; H04L 67/1097; H04L 69/22
See application file for complete search history.

(56) References Cited

U.S. PATENT DOCUMENTS

| | | | |
|---|---|---|---|
| 7,554,984 B2 | 6/2009 | Kalkunte et al. | |
| 9,152,580 B1 | 10/2015 | Chau et al. | |
| 9,164,890 B2 | 10/2015 | Shin et al. | |
| 9,558,124 B2 | 1/2017 | Moon | |
| 9,639,287 B1 | 5/2017 | Malina et al. | |
| 10,325,108 B2 | 6/2019 | Li et al. | |
| 10,412,002 B1* | 9/2019 | Richardson | ............ H04L 45/74 |
| 10,474,397 B2 | 11/2019 | Amberts et al. | |
| 10,678,724 B1 | 6/2020 | ChoFleming et al. | |
| 10,802,756 B1* | 10/2020 | Pream | ..................... G06F 3/061 |
| 10,860,231 B2 | 12/2020 | Byun | |
| 11,200,961 B1 | 12/2021 | Uribe | |

(Continued)

OTHER PUBLICATIONS

Pending U.S. Appl. No. 16/725,824, filed Dec. 23, 2019, entitled "In-Line Data Operations for Storage Systems", Sun et al.

*Primary Examiner* — Jae Y Lee
(74) *Attorney, Agent, or Firm* — Barry IP Law, P.C.

(57) ABSTRACT

A programmable network switch includes at least one pipeline including a packet parser configured to parse packets, and a plurality of ports for communication with network devices including a plurality of Data Storage Devices (DSDs). A packet comprising a write command is received to store data in a DSD of the plurality of DSDs, and an identifier generated for the data is compared to a plurality of identifiers generated for data stored in the plurality of DSDs. It is determined whether to send the write command to store the data to the DSD based on whether the generated identifier matches an identifier of the plurality of identifiers. In one aspect, the data to be stored for the write command is extracted from the packet using a pipeline of the programmable network switch, and at least a portion of the extracted data is used to generate the identifier for the data.

20 Claims, 6 Drawing Sheets

(56) References Cited

U.S. PATENT DOCUMENTS

| | | | |
|---|---|---|---|
| 2014/0195634 A1* | 7/2014 | Kishore | H04L 67/1097 709/213 |
| 2016/0127492 A1* | 5/2016 | Malwankar | H04L 67/1097 709/212 |
| 2017/0017571 A1* | 1/2017 | Choi | G06F 3/0652 |
| 2019/0245922 A1* | 8/2019 | Legtchenko | H04L 41/0672 |
| 2020/0136996 A1* | 4/2020 | Li | H04L 49/356 |
| 2020/0409559 A1 | 12/2020 | Sharon et al. | |
| 2021/0303206 A1 | 9/2021 | Saxena et al. | |

* cited by examiner

IN-LINE DATA IDENTIFICATION ON NETWORK

BACKGROUND

There is an increased need for more storage capacity in data centers, such as for cloud storage applications, big data applications, or Machine Learning (ML) applications. Data deduplication can help increase the available storage capacity by deleting redundant copies of the same data so that the data is only stored in a single location, or in at least a fewer number of locations. As the size of data centers expands to include more Data Storage Devices (DSDs) storing more data, the task of deduplicating data in such networks involves more processing resources and network traffic to identify and delete duplicate copies of data, and to update a mapping for the deleted copies to point to storage locations for the retained copies. Such deduplication can typically be performed by one or more servers or hosts in the network as a background activity for data that has already been stored in one or more DSDs.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Examples

Figure 1:
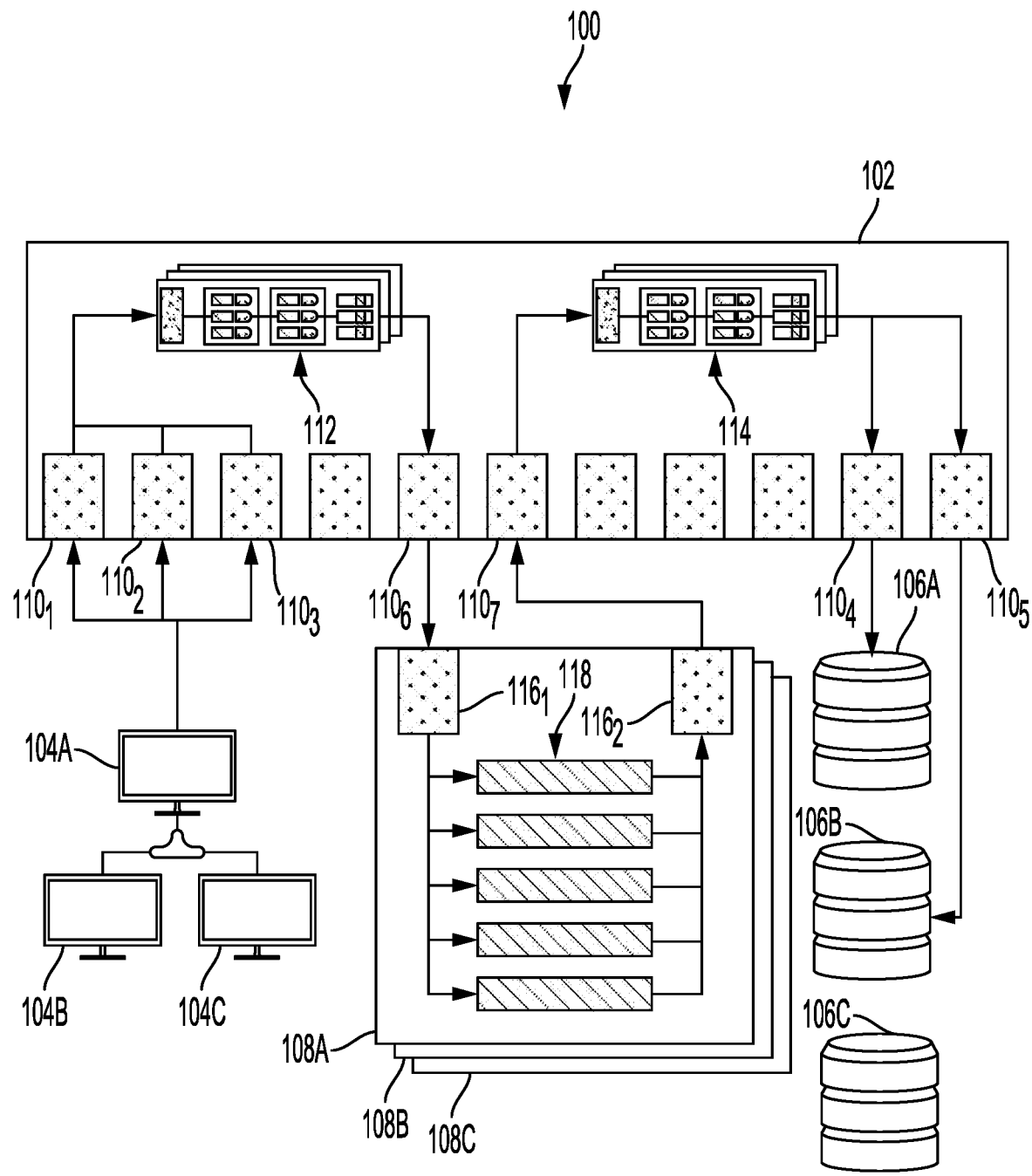
FIG. 1 illustrates an example system for implementing in-line data identification according to one or more embodiments.

FIG. 1 illustrates an example system 100 for implementing in-line data identification according to one or more embodiments. As shown in FIG. 1, clients 104A, 104B, and 104C are in communication with programmable network switch 102 via ports $110_1$, $110_2$, and $110_3$ of programmable network switch 102. Data Storage Devices (DSDs) 106A, 106B, and 106C are in communication with programmable network switch 102 via ports, such as with ports $110_4$ and $110_5$ for DSDs 106A and 106B, respectively. In addition, hardware accelerators 108A, 108B, and 108C are in communication with programmable network switch 102 via ports 110, such as with ports $110_6$ and $110_7$ shown in FIG. 1 as connected to hardware accelerator 108A. As discussed in more detail below, the use of hardware accelerators 108 with programmable network switch 102 is optional, and other implementations may not include hardware accelerators in system 100.

Clients 104A to 104C can include, for example, servers, hosts, or processing nodes that use DSDs 106A, 106B, and 106C for external data storage. In some implementations, system 100 in FIG. 1 may be used as part of a data center and/or for distributed processing, such as for cloud storage, distributed Machine Learning (ML), or big data analysis.

System 100 can include, for example, a Storage Area Network (SAN), a Local Area Network (LAN), and/or a Wide Area Network (WAN), such as the Internet. For example, clients 104 and programmable network switch 102 may communicate via a WAN, while DSDs 106 and programmable network switch 102 may communicate via a LAN or SAN. In this regard, one or more of clients 104A to 104C, programmable network switch 102, and/or one or more of DSDs 106A to 106C may not be physically co-located. Clients 104A to 104C, programmable network switch 102, and DSDs 106A to 106C may communicate using one or more standards such as, for example, Ethernet, Fibre Channel, and/or InifiniBand. Additionally, various "over fabric" type command protocols such as NVMoF have been developed, enabling devices to communicate over the aforementioned standards of communication.

As shown in the example of FIG. 1, hardware accelerators 108A, 108B, and 108C are connected to ports of programmable network switch 102, such as ports $110_6$ and $110_7$. Hardware accelerators 108A to 108C can provide processing and/or memory resources, such as for generating or calculating all or part of a unique identifier or fingerprint for identifying data. Examples of generating an identifier can include, for example, performing an SHA hash function, Cyclic Redundancy Check (CRC) function, or XOR function. In the example of FIG. 1, hardware accelerators 108A, 108B, and 108C can provide parallel or simultaneous generation of identifiers, or portions thereof, to reduce latency in generating identifiers.

In some implementations, hardware accelerators 108 can include, for example, one or more Field Programmable Gate Arrays (FPGAs), Graphics Processing Units (GPUs), or other circuitry that serves as a processing and/or memory offload for programmable network switch 102. In some implementations, a first portion of the data received by programmable network switch 102 for a write command is used by programmable network switch 102 to generate a first portion of an identifier for the data, and a second portion of the data for the write command is sent to a hardware accelerator 108 to generate a second portion of the identifier for the data. Programmable network switch 102 may then join or combine the two identifier portions to form a final identifier for the data.

In FIG. 1, hardware accelerator 108A includes multiple accelerator pipelines 118 including circuitry for parallel processing of the data received from programmable network switch 102 via interface $116_1$ of hardware accelerator 108A. In one example, each accelerator pipeline 118 may concurrently calculate or generate a portion of an identifier for data from the same write command. In another example, each accelerator pipeline 118 may concurrently calculate or generate identifiers for data from different write commands provided by programmable network switch 102. The identifier portions or different identifiers can be returned to programmable network switch 102 via interface 116₂ of hardware accelerator 108A.

In some implementations, interface 116₁ and interface 116₂ of hardware accelerator 108A can include the same physical port or the same physical interface of hardware accelerator 108A. In this regard, programmable network switch 102 and hardware accelerator 108A may communicate using a standard, such as Ethernet, Fibre Channel, InifiniBand, or Peripheral Component Interconnect express (PCIe), for example. Hardware accelerators 108B and 108C may have a similar or different arrangement than shown for hardware accelerator 108A in FIG. 1.

DSDs 106A to 106C can include, for example, one or more rotating magnetic disks in the case of a Hard Disk Drive (HDD), or non-volatile solid-state memory, such as flash memory or Storage Class Memory (SCM), in the case of a Solid-State Drive (SSD). In some examples, DSDs 106A, 106B, and/or 106C may include different types of storage media, such as in the case of a Solid-State Hybrid Drive (SSHD) that includes both a rotating magnetic disk and a solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete Non-Volatile Memory (NVM) chips, or any combination thereof.

Programmable network switch 102 routes messages or packets, such as read and write commands for data, and other communications between clients 104 and DSDs 106. As discussed in more detail below, programmable network switch 102 compares identifiers generated for data from a write command to a plurality of identifiers stored in an ID table representing data already stored in DSDs 106A to 106C. In some implementations, the ID table can include a hash table for identifying data using the generated identifiers. The ID table (e.g., ID table 10 in FIGS. 2A to 2C) may be stored at programmable network switch 102 or in a hardware accelerator 108. In other implementations, the ID table stored at programmable network switch 102 may only include the most recently accessed and/or most frequently accessed identifiers to conserve storage space at programmable network switch 102 and/or at a hardware accelerator 108. In such cases, or in cases where no ID table is stored at programmable network switch 102 or at a hardware accelerator 108, programmable network switch 102 may instead request some or all of DSDs 106A to 106C to search an ID table locally stored at the DSD (e.g., ID tables 16 in FIGS. 2A to 2C) for a matching identifier.

In some cases, programmable network switch 102 may determine whether to forward or send a write command to a DSD based on whether a unique identifier or fingerprint matches another identifier or fingerprint of the plurality of previously generated identifiers or fingerprints. In addition, programmable network switch 102 may extract a portion of a packet or message, such as a payload or portion thereof, for generating the identifier. In this regard, programmable network switch 102 may be programmed to process different communication formats or protocols, and extract a data portion used to generate an identifier for data intended by a client 104 to be stored in a DSD 106 for a write command. For example, some write commands may arrive in the form of an Ethernet packet including a header and a payload. Programmable network switch 102 can be configured to identify a data portion within the payload that may be separate from instructions for the write command that may be included in the payload of the Ethernet packet. The data portion can be extracted from the payload and used to generate the identifier or fingerprint for the data, without the instructions for performing the write command.

In one example, programmable network switch 102 can be 64 port Top of Rack (ToR) P4 programmable network switch, such as a Barefoot Networks Tofino Application Specific Integrated Circuit (ASIC) with ports configured to provide 10, 40, or 100 Gigabit Ethernet (GE) frame rates. Other examples of programmable network switches that can be used as a programmable network switch in system 100 can include, for example, a Cavium Xpliant programmable network switch or a Broadcom Trident 3 programmable network switch.

A data plane of programmable network switch 102 is programmable and separate from a higher-level control plane that determines end-to-end routes for messages or packets between devices in system 100. In this regard, the control plane can be configured for different processes, such as the processes of FIGS. 3 and 4 for handling write commands and read commands, as discussed in more detail below.

By using programmable network switch 102 for generating at least a portion of the identifier and/or determining whether to send a write command to a DSD as an in-line process while the data is in transit, it is ordinarily possible to improve data deduplication in system 100, as compared to performing data identification and deduplication after redundant data has already been stored in a DSD. Storage space at DSDs 106A to 106C can be conserved at the outset by not sending write commands to the DSDs for data that is already stored in system 100. In addition, the use of processing and memory resources, as well as network traffic, is reduced by not having to subsequently identify and deduplicate redundant copies of data after the redundant copies have been stored in DSDs 106A to 106C.

In the example of FIG. 1, pipelines 112 receive and process messages or packets received from clients 104 and may route extracted data or a payload portion of the messages or packets to hardware accelerators 108 for generating at least a portion of a unique identifier using the extracted data or portion of the payload. The unique identifiers are then fed back into pipelines 114 for comparing the unique identifiers to previously generated identifiers for data already stored in DSDs 106A to 106C, and in some implementations, updating ID table 10, creating new write commands for automatically providing a data backup (as in the example of FIG. 2A discussed below), creating a new write completion message (as in example of FIG. 2B discussed below), and/or creating new or redirected read commands for retrieving requested data from a different DSD (as in the example of FIG. 2C discussed below). In other implementations, pipelines 112 may instead generate identifiers or the entirety of the identifiers for data received for write commands, as opposed to routing data to a hardware accelerator to generate identifiers or portions thereof.

Pipelines 112 and 114 can also provide a configurable data plane and customized packet processing capability. In this regard, pipelines 112 and 114 may be programmed using, for example, P4, and can be capable of parallel processing of packets or data in sequential stages. Each pipeline can include, for example, a parser, one or more processing stages, a traffic manager, and a deparser.

For its part, the parser can be configured to extract packet or message headers, packet or message payloads, and values or data from the headers and/or payloads, such as a network destination address, message type, and/or a network source address from a header, and a command type, data address, and data to be stored from a payload. As discussed in more detail below, the extracted values or data from the header and payload can be used for match-action operations performed by the processing stages of programmable network switch 102.

The processing stages can include, for example, programmable Arithmetic Logic Units (ALUs) or other circuitry, and one or more memories (e.g., memory 105 in FIG. 2A) that store match-action tables for matching extracted values and data, and performing different corresponding actions based on the matching or non-matching, such as the generation of an identifier for data to be stored in DSDs 106, comparison of IDs to a plurality of IDs for data stored in DSDs 106, updating ID table 10, creating new read or write commands, and/or creating a new write completion message. The matches and corresponding actions are made according to predefined rules and the extracted values or data.

The extracted values or data for a message received by programmable network switch 102 are fed into one or more processing stages, which can identify the received message as a write command. For a write command, a traffic manager of pipeline 112 can route an extracted data portion of a payload of the message to an appropriate port of programmable network switch 102, such as to port $110_6$ for generating an identifier for the extracted data portion by hardware accelerator 108A. In other implementations, programmable network switch 102 may generate part of the identifier or may generate all of the identifier without routing the data portion to a hardware accelerator. In cases where the message received by programmable network switch 102 is a read command, the processing stages in some implementations may instead compare a data address for the data requested by the read command to other data addresses in an ID table. In other cases, a message received by programmable network switch 102 that is not identified as a write command or a read command may be routed or forwarded by the traffic manager to its intended destination in system 100 with less processing by programmable network switch 102.

The deparser of pipeline 112 can be configured to package or assemble data, such as data extracted from a write command, in a format or standard for communication with a hardware accelerator 108. In this regard, some implementations may include a mix of different types of hardware accelerators that may communicate using different formats or standards to allow for different functions to be performed by the different hardware accelerators.

Pipelines 114 can also each include a parser, in addition to one or more processing stages, a traffic manager, and a deparser. Data received from hardware accelerators 108, such as generated identifiers or portions thereof, may be extracted from messages or packets received from hardware accelerators 108 for comparison to stored identifiers using one or more processing stages of pipeline 114. In this regard, an ID table, or portions thereof, may be implemented as a match-action table that is used by a processing stage of programmable network switch 102 to compare the generated identifier to previously generated identifiers. A traffic manager of pipeline 114 may determine a port for sending a write command to a DSD 106 or a write completion message to a client 104. The deparser of the pipeline 114 can be configured to construct a message or packet for communicating with the DSD 106 or the client 104.

As will be appreciated by those of ordinary skill in the art, other implementations may include a different arrangement of modules for a programmable network switch. For example, other implementations may include only a single pipeline 112 and a single pipeline 114. As another example variation from FIG. 1, other implementations may only include a single pipeline or a single set of parallel pipelines that serve the functions of pipelines 112 and pipelines 114 of FIG. 1. In such implementations, the pipeline could include processing stages to generate identifiers and compare them to existing identifiers for data stored in DSDs 106, update an ID table, and/or create new messages (e.g., write commands, read commands, and/or write completion messages) as needed.

As discussed in more detail below, the use of a programmable network switch between clients 104 and DSDs 106 allows for in-line data identification (i.e., while the data is being transferred between the client and DSD) and/or deduplication. Such in-line data identification and deduplication are ordinarily more efficient in terms of time and processing resources than identifying redundant data and performing deduplication after the redundant data has already been stored in DSDs 106. Programmable network switch 102 also allows for a protocol-independent handling of both incoming messages and outgoing messages when communicating with devices in system 100, such as with clients 104, DSDs 106, and hardware accelerators 108.

As will be appreciated by those of ordinary skill in the art, system 100 may include additional devices or a different number of devices than shown in the example of FIG. 1. For example, some implementations may not include hardware accelerators 108 or may include a different number of clients 104, programmable network switches 102, or DSDs 106. As another example variation, some implementations may include a separate server, host, or controller for storing metadata, such as a global ID table relating DSDs or ports of programmable network switch 102 for such DSDs to the identifiers for the data stored in the DSDs.

Figure 2A:
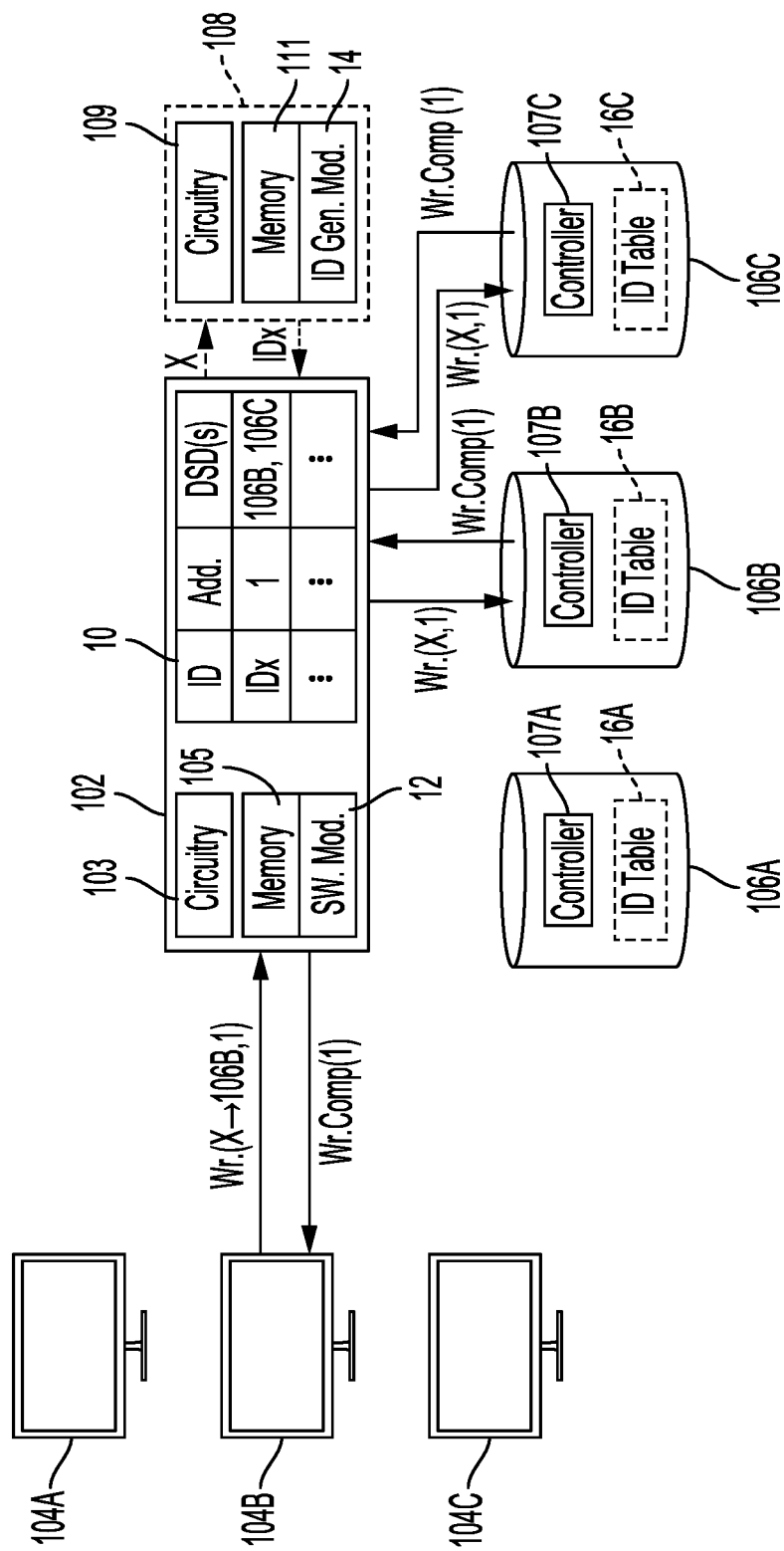
FIG. 2A illustrates an example of the performance of a write command by components in the system of FIG. 1 according to one or more embodiments.

FIG. 2A illustrates an example of the performance of a write command by components of system 100 of FIG. 1 according to one or more embodiments. As shown in the example of FIG. 2A, programmable network switch 102 includes circuitry 103 and memory 105, which can include pipelines 112 and pipelines 114 discussed above with reference to FIG. 1.

Circuitry 103 can execute instructions, such as instructions from switch module 12, and can include, for example, one or more ASICs, microcontrollers, DSPs, FPGAs, hardwired logic, analog circuitry and/or a combination thereof. In some implementations, circuitry 103 can include a System on a Chip (SoC), which may be combined with memory 105 or portions thereof.

Memory 105 of programmable network switch 102 can include, for example, a volatile RAM such as DRAM, or a non-volatile RAM or other solid-state memory such as register arrays that are used by circuitry 103 to execute instructions loaded from switch module 12 or firmware of the programmable network switch 102, and/or data used in executing such instructions, such as ID table 10. In this regard, switch module 12 can include instructions for routing and/or processing messages or packets, and/or implementing processes such as those discussed with reference to FIGS. 3 and 4 below for handling write commands and read commands received by programmable network switch 102.

In some implementations, ID table 10 can be stored in memory 105 as one or more data structures. In the example of FIG. 2A, ID table 10 includes identifiers for data and associated data addresses corresponding to one or more storage locations for the data identified by the identifier. ID table 10, in some implementations, may also indicate one or more DSDs that store the data, such as with a network address for the DSD. As will be appreciated by those of ordinary skill in the art, ID table 10 may include different information than that shown in FIG. 2A. For example, other implementations may include an address range for the data or size for the data represented by the ID, or may include usage or access information for the data, such as a frequency of access or a last access time for the data.

As shown in FIG. 2A, programmable network switch 102 optionally uses hardware accelerator 108, which includes circuitry 109 and memory 111 storing ID generating module 14. Circuitry 109 and memory 111 can include, for example, an FPGA, a GPU, or other circuitry that serves as a processing and/or memory offload for programmable network switch 102. In the example of FIG. 2A, hardware accelerator 108 executes ID generating module 14 for generating at least a portion of an identifier for data received from programmable network switch 102. In some implementations, ID generator module 14 can perform a hash function on data received from programmable network switch 102 to generate an ID for the data. In this regard, ID table 10 and/or ID tables 16 shown in FIG. 1 can include hash tables in some implementations for identifying data using the generated identifiers. In other examples, hardware accelerator 108 may store ID table 10 or a portion thereof.

Each of DSDs 106A, 106B, and 106C include a respective controller 107 that controls operation of the DSD, and can include circuitry such as a microcontroller, a DSP, an FPGA, an ASIC, hard-wired logic, analog circuitry and/or a combination thereof. In some implementations, a controller 107 can include an SoC, which may be combined with an interface of the DSD, and/or a memory of the DSD.

In addition, one or more of DSDs 106A, 106B, and 106C can store an ID table, such as optional ID tables 16A, 16B, and 16C, associating identifiers for data and the addresses for the data. In some implementations, each DSD may store an ID table 16 for the data stored in the DSD. In other implementations, a DSD 106 may store an ID table for data stored in multiple DSDs 106, or alternatively, none of the DSDs may store an ID table. For example, in some cases, ID table 10 at programmable network switch 102 may be eliminated such that programmable network switch 102 may compare an identifier generated for data to a plurality of identifiers by sending one or more messages to one or more DSDs 106 to check an ID table 16 at the DSD or DSDs 106.

In the example of FIG. 2A, a write command is sent from client 104B to programmable network switch 102 to write data X at address 1 of DSD 106B (i.e., Wr.(X→106B, 1) in FIG. 2A). Programmable network switch 102 receives the write command and extracts data X from the write command. In this regard, the term write command can refer to the message or packet that is received from client 104B that includes data X to be written in DSD 106B. Circuitry 103 of programmable network switch 102 generates an identifier from the extracted data X by sending the extracted data X to hardware accelerator 108 for generation of the identifier using ID generating module 14.

After the identifier is received by programmable network switch 102 from hardware accelerator 108, programmable network switch 102, compares the identifier to a plurality of identifiers generated for data stored in DSDs 106A, 106B, and 106C, such as by using an egress pipeline 114 as shown in FIG. 1. Depending on the outcome of the comparison, programmable network switch 102 can determine whether to forward the write command to DSD 106B per a destination address of the header for the write command. In the example of FIG. 2A, a matching ID is not found in ID table 10. As a result, programmable network switch 102 determines to send or forward the write command to DSD 106B for address 1. Specifically, sending or forwarding the write command can include programmable network switch 102 repackaging or reassembling the write command, such as by a deparser of a pipeline, to be sent to DSD 106B. In addition, a write command is also sent to DSD 106C to store a copy of data X in the example of FIG. 2A.

Programmable network switch 102, in some implementations, may be configured to automatically copy data stored in DSDs 106A and 106B in DSD 106C as a backup. The additional write command for the in-line backup may only be sent to DSD 106C if a copy of the data has not already been stored in DSD 106A or DSD 106B. In some implementations, if there is difficulty accessing data X from DSD 106B, circuitry 103 of programmable network switch 102 may use a deparser send a read command to DSD 106C instead to retrieve data X without involvement of the device that sent the read command. Other implementations may not include an automatic in-line backup performed by programmable network switch 102, or may only backup certain data or data to be stored on a particular DSD. For example, a write command received from a client 104 can include a flag or other identifier such as an address for the data in a certain address range that indicates to programmable network switch 102 that the data should be backed up.

After storing data X, DSDs 106B and 106C return write completion messages for address 1 (i.e., Wr.Comp(1) in FIG. 2A) to programmable network switch 102. Circuitry 103 of programmable network switch 102 updates ID table 10 to include IDx generated from data X, address 1 for data X, and indications for DSDs 106B and 106C where the data associated with IDx has been stored. In addition, programmable network switch 102 forwards or sends the write completion message to client 104B to indicate that data X has been stored in DSD 106B.

Figure 2B:
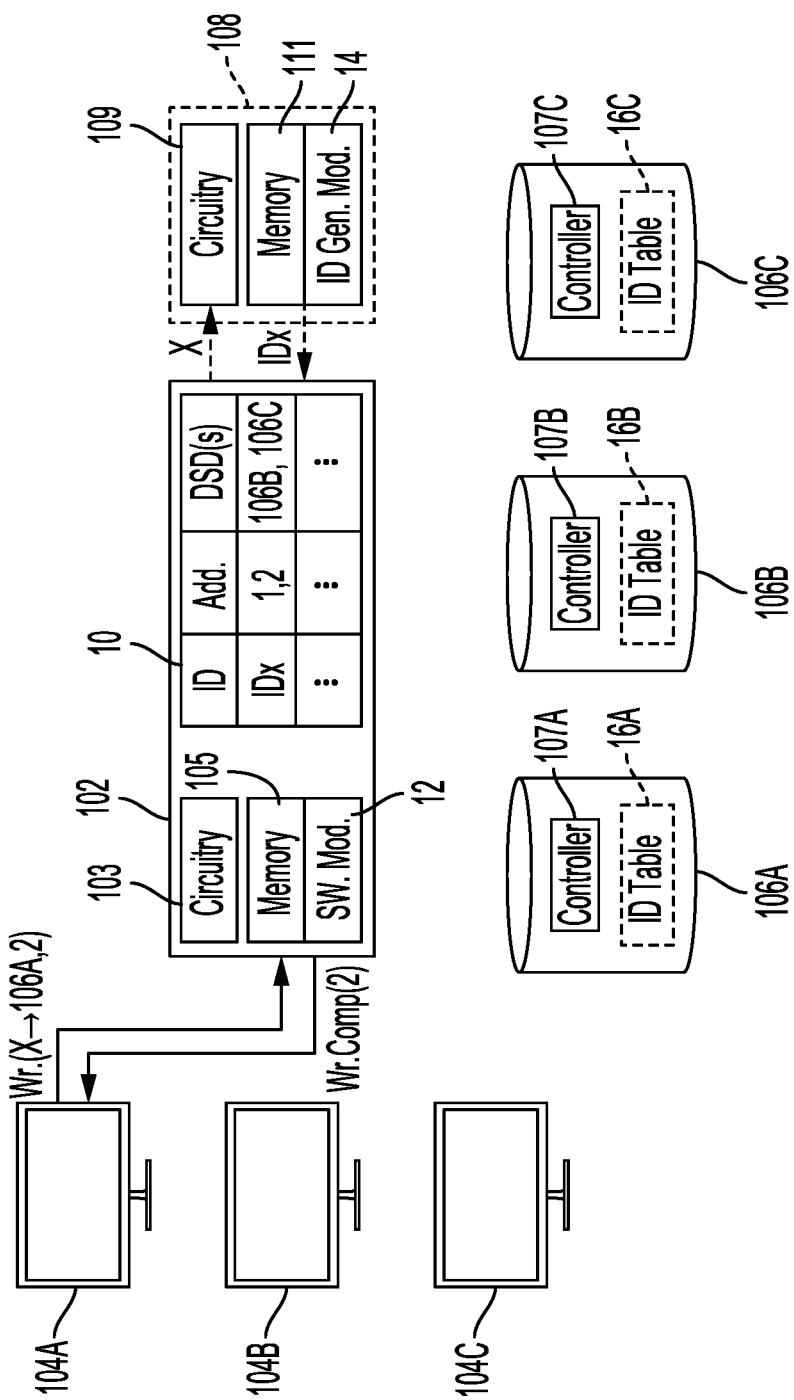
FIG. 2B illustrates an example of the performance of a second write command for redundant data by components in the system of FIG. 1 according to one or more embodiments.

FIG. 2B illustrates an example of the performance of a second write command for data X by components in system 100 according to one or more embodiments. The performance of the second write command in FIG. 2B differs from that of the write command in FIG. 2A in that programmable network switch 102 determines not to forward or send the write command to the DSD indicated by the write command.

In the example of FIG. 2B, client 104A sends the second write command to programmable network switch 102 for storage of data X in DSD 106A at address 2. Programmable network switch 102 extracts data X from the write command, and sends the extracted data to hardware accelerator 108 to generate the identifier IDx for data X, which is returned to programmable network switch 102 for comparison to identifiers in ID table 10.

Since the identifier IDx matches the identifier for data X previously stored in ID table 10, programmable network switch 102 determines not to send or forward the write command to DSD 106A. In the example of FIG. 2B, programmable network switch 102 updates ID table 10 to include address 2 as one of the addresses for data X associated with IDx.

Programmable network switch 102 also sends a write completion message to client 104A to indicate that data X has been stored at address 2 of DSD 106A. In this case, the fact that data X has not actually been stored in DSD 106A may be hidden from client 104A. In other implementations, the write completion message can alternatively indicate that the data has been stored at address 1 of DSD 106B and/or DSD 106C.

The comparison of identifiers in the present disclosure can ordinarily allow for in-line data deduplication to be performed before redundant data is actually stored in a DSD, thereby more immediately conserving storage space, and subsequently conserving processing and memory resources that would have been used to identify and deduplicate the redundant data. In addition, network traffic is reduced in that write commands to write redundant data are not forwarded to DSDs, and subsequent communications are not needed to identify and remove redundant data stored in the DSDs.

Figure 2C:
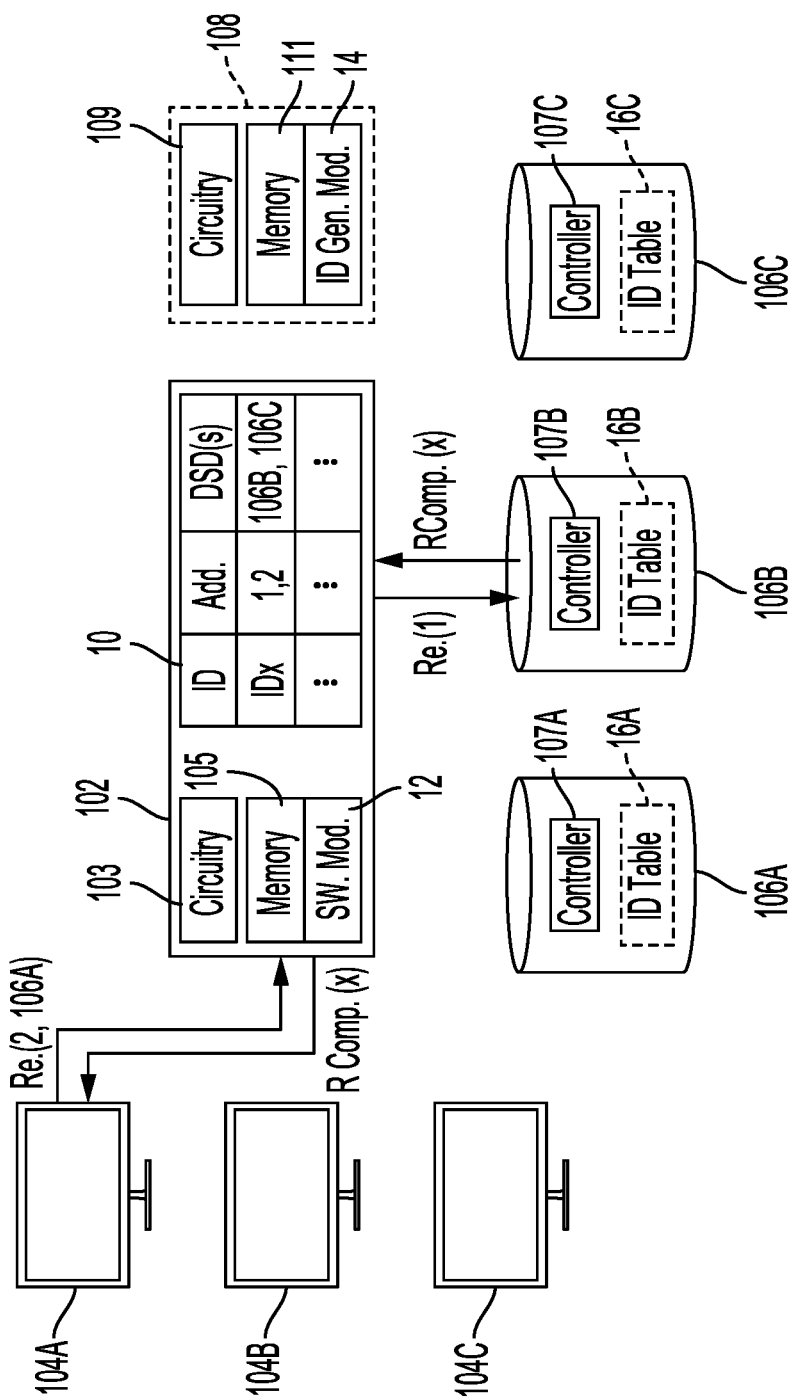
FIG. 2C illustrates an example of the performance of a read command for the redundant data of FIG. 2B according to one or more embodiments.

FIG. 2C illustrates an example of the performance of a read command from client 104A for data X according to one or more embodiments. In the example of FIG. 2C, client 104A sends a read command to programmable network switch 102 to retrieve data X at address 2 of DSD 106A (i.e., Re(2,106A) in FIG. 2C). However, in the example of FIG. 2B discussed above, data X was not actually written at DSD 106A. Programmable network switch 102 receives the read command and can check ID table 10 or another data structure, such as an address mapping, to identify address 2 and determine that the requested data is stored in DSD 106B, rather than in DSD 106A. Programmable network switch 102 using a deparser sends a read command to DSD 106B to retrieve data for address 1 of DSD 106B.

Data X is returned by DSD 106B to programmable network switch 102 (i.e., RComp.(X) in FIG. 2C). Programmable network switch 102 then returns data X to client 104A to complete performance of the read command. The retrieval of data X from DSD 106B instead of from DSD 106A can be hidden from client 104A or may be indicated as part of returning the requested data to client 104A.

As will be appreciated by those of ordinary skill in the art, other implementations may include a different arrangement or number of components, or modules than shown in the examples of FIGS. 2A to 2C. For example, in some implementations, a separate device in system 100 may store ID table 10, which is accessed by programmable network switch 102 to compare identifiers and/or locate data in DSDs 106.

Example Processes

Figure 3:
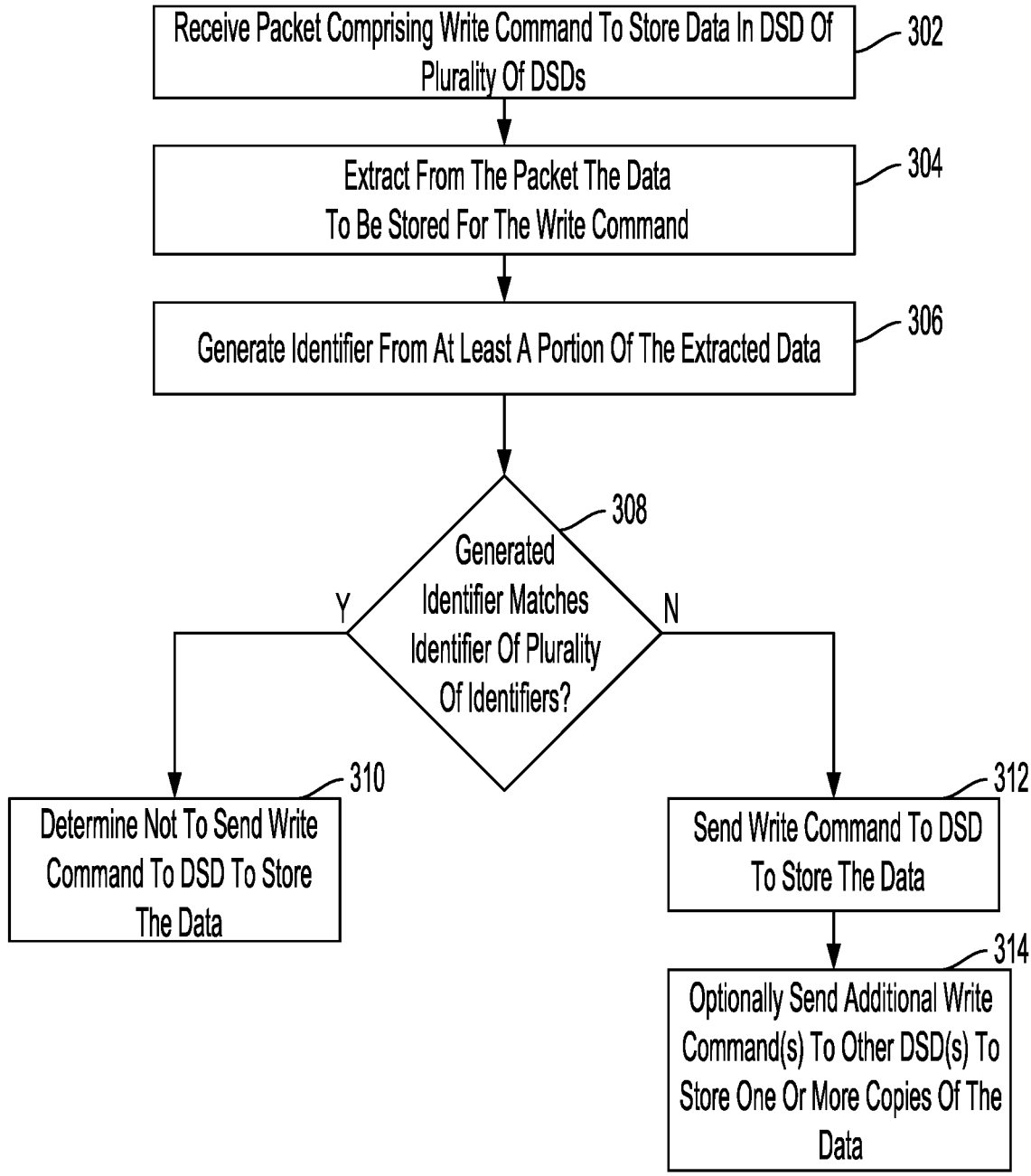
FIG. 3 is a flowchart for an in-line data identification process according to one or more embodiments.

FIG. 3 is a flowchart for a data identification process according to one or more embodiments. The process of FIG. 3 can be performed by, for example, programmable network switch 102 executing switch module 12 and/or one or more hardware accelerators 108 executing ID generating module 14.

In block 302, a packet comprising a write command is received to store data in a DSD of a plurality of DSDs. With reference to the example of FIG. 2A discussed above, programmable network switch 102 may receive a write command or packet from a client 104 to store data in a DSD 106. The write command or packet may include a header or different frames following a format, such as a standard 802.3 Layer 1 frame format, for example. A header of the write command may include information such as a source for the command (e.g., a network address for a client 104), a message type (e.g., indicating a format of the message), and/or a destination address (e.g., a network address for a DSD 106). The write command can also include a payload or data portion including the data to be written in the DSD with instructions for performing the write command, such as an indication of the command type and an address for the data to be written.

In block 304, the programmable network switch extracts the data from the write command that is to be stored for the write command using a pipeline of the programmable network switch. In more detail, the data may be extracted by a parser and/or by a processing stage that may be part of an ingress pipeline (e.g., pipeline 112 in FIG. 1).

In block 306, an identifier is generated from at least a portion of the extracted data. In some implementations, the programmable network switch may directly generate the identifier or fingerprint, such as by inputting the extracted data or portion thereof into an identifier generating function. The identifier generating function can include, for example, a hash function, Cyclic Redundancy Check (CRC) function, or XOR function. In other implementations, some or all of the generation of the identifier can be performed by a hardware accelerator in communication with the programmable network switch, as in the example of FIG. 1 discussed above.

In block 308, the programmable network switch compares the identifier generated in block 306 to a plurality of identifiers generated for data stored in the plurality of DSDs (e.g., DSDs 106 in FIG. 1). It is determined whether the generated identifier matches an identifier of a plurality of identifiers for data stored in the plurality of DSDs. As discussed above with reference to the example of FIG. 1, one or more processing stages of the programmable network switch may be used to compare the generated ID to the existing IDs stored in an ID table, which may serve as a match-action table or form part of a match-action table for the comparison. In other embodiments, the programmable network switch may send the generated identifier to another device or devices for comparison. For example, the generated identifier may be sent to one or more DSDs for comparison using an ID table or ID tables (e.g., ID tables 16) stored in the DSD(s). In another example, the generated identifier may be sent to a server, host, or controller, which may store the ID table for comparison.

If the generated identifier matches a matching identifier in block 308, the programmable network switch determines not to send or forward the write command to the DSD to store the data, since the matching of the identifier indicates that a copy of the data to be written is already stored in a DSD of the plurality of DSDs (e.g., DSDs 106). With reference to the example discussed above for FIG. 2B, programmable network switch 102 receives a write command from client 104A and determines not to send the write command to DSD 106A, since ID table 10 indicates that data X has already been stored in DSDs 106B and 106C.

The programmable network switch in block 310 of FIG. 3 may also create a new write completion message to return to the device that sent the write command to indicate that the data has been written. In some implementations, such a write completion message may include the address and location where the data was previously stored. In other implementations, the previous storage of the data may be transparent or hidden from the device that sent the write command.

On the other hand, if it is determined in block 308 of FIG. 3 that the generated identifier does not match a previously generated identifier, the programmable network switch in block 312 sends or forwards the write command to the DSD to store the data. In this regard, a deparser of the programmable network switch may reassemble or repackage the write command to send to the DSD indicated by the write command received in block 302.

In block 314, the programmable network switch may also send one or more additional write commands to other DSDs to store one or more copies of the data for the write command. In this regard, the programmable network switch can be configured to automatically create new write commands for backing up data for all data stored in a particular DSD on a different DSD, or for only backing up certain data, which may be indicated, for example, using a flag in the write command or an address for the data in the write command. In other implementations, block 314 may be omitted such that no additional write commands are created by the programmable network switch to automatically backup data.

Figure 4:
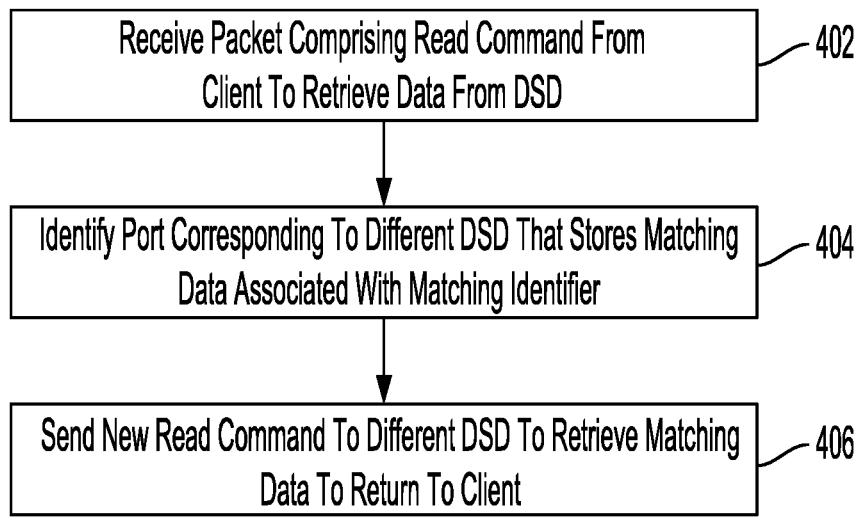
FIG. 4 is a flowchart for a read command redirection process according to one or more embodiments.

FIG. 4 is a flowchart for a read command redirection process according to one or more embodiments. The process of FIG. 4 can be performed by, for example, programmable network switch 102 executing switch module 12.

In block 402, the programmable network switch receives a packet comprising a read command from a client to retrieve data from a DSD. With reference to the example of FIG. 2C discussed above, programmable network switch 102 may receive a read command from a client 104 to retrieve data from a DSD 106. The use of the term "read command" can refer to the message or packet received by the programmable network switch to retrieve data from a DSD.

The packet for the read command, or the read command, may include a header and payload following a format, such as a standard 802.3 Layer 1 frame format, for example. A header of the read command may include information such as a source for the command (e.g., a network address for a client 104), a message type (e.g., an indication of the format of the message), and/or a destination address (e.g., a network address for a DSD 106). The payload may include information for performing the read command, such as a command type and address for the requested data. A parser or processing stage of the programmable network switch may extract the address and command type for processing by a pipeline of the programmable network switch.

In block 404, the programmable network switch identifies a port of the programmable network switch corresponding to a different DSD than the DSD indicated by the read command to retrieve matching data to return to the client for the read command. In some implementations, an ingress pipeline may include one or more processing stages that check an ID table or other data structure, such as an address mapping, for a matching address for the data requested by the read command, which may have been extracted from a payload of the message. In such implementations, the ID table or other data structure stored at the programmable network switch may be a subset of the addresses for all of the data stored in the plurality of DSDs, such as an ID table for the most frequently accessed data and/or the most recently accessed data. The data structure checked in block 404 can relate addresses for data stored in the DSDs with, for example, an indication of a port of the programmable network switch or a network address for the DSD storing the data.

As discussed above, an ID table or other data structure can be stored in the programmable network switch or at one or more other devices, as in the case of optional ID tables 16 in FIGS. 2A to 2C. In some cases, the ID table or other data structure may be stored at a dedicated device such as a controller, host, or server for the system, or at a hardware accelerator in communication with the programmable network switch. In implementations where an ID table or other data structure is stored outside of the programmable network switch and is to be checked for a matching address, the programmable network switch can send a request message to the other device to check for the address indicated by the read command. The other device may then respond back to the programmable network switch to indicate whether the address was found in the ID table or other data structure, and to indicate a different address and/or a different DSD storing the data than the address or DSD indicated by the read command.

In block 406, the programmable network switch, using a deparser of the programmable network switch, sends a new read command to a different DSD to retrieve the matching data to return to the client that sent the read command received in block 402. With reference to the examples of FIGS. 1 and 2C discussed above, programmable network switch 102 can identify port $110_5$ for DSD 106B, rather than port $110_4$ for DSD 106A, that stores matching data X by using ID table 10. A new read command for address 1 at DSD 106B is created and sent to DSD 106B to retrieve data X requested by client 104A from DSD 106A at address 2. In creating the new read command, the programmable network switch may use a different address and may not include the original read command indicating the DSD from which to retrieve the data.

As discussed above, the foregoing use of a centralized programmable network switch to perform in-line data identification and deduplication can ordinarily improve the efficiency of such identification and deduplication in terms of time, processing resources, and network traffic. In addition, the use of a programmable network switch can also allow for a variety of different communication protocols among devices in the system, such as hardware accelerators that may be used by the programmable network switch in generating identifiers for identifying the data.

Other Embodiments

Those of ordinary skill in the art will appreciate that the various illustrative logical blocks, modules, and processes described in connection with the examples disclosed herein may be implemented as electronic hardware, software, or combinations of both. Furthermore, the foregoing processes can be embodied on a computer readable medium which causes a processor, controller, or other circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable network switch, comprising:
a plurality of ports for communication with network devices including a plurality of Data Storage Devices (DSDs) that are separate devices from the programmable network switch, wherein different ports of the plurality of ports are configured to communicate with respective DSDs of the plurality of DSDs;
at least one pipeline configured to parse packets received by at least one port of the plurality of ports; and
circuitry configured to:
receive a packet comprising a write command to store data in a DSD of the plurality of DSDs;
extract, from a payload of the packet using a pipeline of the at least one pipeline, data to be stored in the DSD for the write command to generate an identifier;
compare the generated identifier to a plurality of identifiers generated for data stored in the plurality of DSDs;
determine that the generated identifier matches a matching identifier of the plurality of identifiers; and
in response to determining that the generated identifier matches the matching identifier, determine not to send the write command to the DSD to store the data.

2. The programmable network switch of claim 1, wherein the circuitry is further configured to:
generate at least part of the identifier using at least a portion of the extracted data.

3. The programmable network switch of claim 1, wherein a hardware accelerator in communication with the programmable network switch is configured to:
receive at least a portion of the extracted data from the pipeline of the programmable network switch; and
generate at least part of the identifier using the at least a portion of the extracted data.

4. The programmable network switch of claim 3, further comprising one or more additional hardware accelerators in communication with the programmable network switch, wherein each of the one or more additional hardware accelerators is configured to:
generate identifiers for identifying data to be stored in at least one DSD of the plurality of DSDs; and
send the generated identifiers to the programmable network switch for comparison of the generated identifiers to the plurality of identifiers.

5. The programmable network switch of claim 1, wherein the circuitry is further configured to:
receive a plurality of packets comprising write commands to store data in at least one DSD of the plurality of DSDs, wherein at least two packets of the plurality of packets are formatted using different communication protocols when received by the programmable network switch; and
extract, from respective payloads of the at least two packets using the at least one pipeline, the data to be stored for the write commands of the at least two packets; and
wherein at least a portion of the extracted data for each of the write commands of the at least two packets is used to generate a respective identifier for comparison to the plurality of identifiers.

6. The programmable network switch of claim 1, wherein the circuitry is further configured to:
receive a packet comprising a read command from a client to retrieve the data from the DSD;
identify a port of the plurality of ports corresponding to a different DSD of the plurality of DSDs that stores matching data associated with the matching identifier; and
send a new read command to the different DSD using a deparser of the programmable network switch to retrieve the matching data to return to the client for the read command.

7. The programmable network switch of claim 1, wherein the circuitry is further configured to send an additional write command to a different DSD of the plurality of DSDs to store a copy of the data using a deparser of the programmable network switch.

8. The programmable network switch of claim 1, wherein the plurality of identifiers is stored in the programmable network switch.

9. A method of operating a programmable network switch, the method comprising:
receiving a packet comprising a write command to store data in a Data Storage Device (DSD) of a plurality of DSDs in communication with the programmable network switch;
extracting, from a payload of the packet separate from a header of the packet, a data portion to be stored in the DSD for the write command using a pipeline of the programmable network switch;
comparing an identifier, calculated for the data portion to be stored in the DSD using at least a portion of the extracted data portion, to a plurality of identifiers calculated for data stored in the plurality of DSDs;

determining whether to send the write command to store the data to the DSD based on whether the calculated identifier matches an identifier of the plurality of identifiers; and in response to determining to send the write command to store the data to the DSD, sending an additional write command to a different DSD of the plurality of DSDs to store a copy of the data.

10. The method of claim 9, further comprising calculating at least part of the identifier using the programmable network switch.

11. The method of claim 9, further comprising calculating at least part of the identifier using a hardware accelerator configured to receive the at least a portion of the extracted data portion from the pipeline of the programmable network switch.

12. The method of claim 9, further comprising:
calculating identifiers for identifying data to be stored in at least one DSD of the plurality of DSDs using one or more hardware accelerators in communication with the programmable network switch; and
sending the calculated identifiers to the programmable network switch for comparison of the calculated identifiers to the plurality of other calculated identifiers.

13. The method of claim 9, further comprising:
receiving a plurality of packets comprising write commands to store data in at least one DSD of the plurality of DSDs, wherein at least two packets of the plurality of packets are formatted using different communication protocols when received by the programmable network switch; and
extracting from respective payloads of the at least two packets, respective data portions to be stored for the write commands of the at least two packets; and
wherein at least a portion of the extracted data portions for each of the at least two packets is used to calculate a respective identifier for comparison to the plurality of identifiers.

14. The method of claim 9, further comprising:
determining that the calculated identifier matches a matching identifier of the plurality of identifiers; and
in response to determining that the calculated identifier matches the matching identifier, determining not to send the write command to the DSD to store the data.

15. The method of claim 14, further comprising:
receiving a packet comprising a read command from a client to retrieve the data from the DSD;
identifying a port of the programmable network switch corresponding to a different DSD of the plurality of DSDs that stores matching data associated with the matching identifier; and
sending a new read command to the different DSD using a deparser of the programmable network switch to retrieve the matching data to return to the client for the read command.

16. The method of claim 9, wherein the plurality of identifiers is stored in the programmable network switch.

17. The method of claim 9, wherein the plurality of identifiers is stored in one or more DSDs of the plurality of DSDs.

18. The method of claim 9, wherein:
the DSDs of the plurality of DSDs are separate devices from the programmable network switch; and
the programmable network switch includes different ports configured to communicate with respective DSDs of the plurality of DSDs.

19. A programmable network switch, comprising:
means for receiving at least two packets comprising write commands to store data in at least one Data Storage Device (DSD) of a plurality of DSDs in communication with the programmable network switch, wherein the at least two packets are formatted using different communication protocols when received by the programmable network switch;
means for extracting, from respective payloads of the at least two packets, respective data portions to be stored for the write commands of the at least two packets;
means for comparing respective identifiers generated for the respective data portions to a plurality of identifiers generated for data stored in the plurality of DSDs;
means for determining that the generated identifiers match matching identifiers of the plurality of identifiers; and
means for determining not to send the write commands to the at least one DSD to store the data in response to determining that the generated identifiers match the matching identifiers.

20. The programmable network switch of claim 19, further comprising
means for generating at least part of the identifiers using at least a portion of the respective data portions.

* * * * *